(12) United States Patent
Mende et al.

(10) Patent No.: US 11,378,154 B2
(45) Date of Patent: Jul. 5, 2022

(54) TORSIONAL VIBRATION DAMPER

(71) Applicant: Schaeffler Technologies AG & Co. KG, Herzogenaurach (DE)

(72) Inventors: Hartmut Mende, Bühl (DE); Dieter Eireiner, Mühlacker/Dürrmenz (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/044,345

(22) PCT Filed: Jan. 16, 2019

(86) PCT No.: PCT/DE2019/100038
§ 371 (c)(1),
(2) Date: Oct. 1, 2020

(87) PCT Pub. No.: WO2019/196970
PCT Pub. Date: Oct. 17, 2019

(65) Prior Publication Data
US 2021/0025474 A1    Jan. 28, 2021

(30) Foreign Application Priority Data
Apr. 10, 2018 (DE) .......................... 102018108404.8

(51) Int. Cl.
*F16F 15/14* (2006.01)
*F16F 15/121* (2006.01)

(52) U.S. Cl.
CPC ........ *F16F 15/145* (2013.01); *F16F 15/1211* (2013.01)

(58) Field of Classification Search
CPC .................................................. F16F 15/1211
See application file for complete search history.

(56) References Cited

FOREIGN PATENT DOCUMENTS

| CN | 1955507 A | * | 5/2007 | ........ F16F 15/13121 |
|----|-----------|---|--------|-----------------------|
| CN | 103596789 A | | 2/2014 | |
| CN | 103649582 A | | 3/2014 | |
| CN | 104395639 A | | 3/2015 | |
| CN | 107208735 A | | 9/2017 | |
| DE | 112013002877 T5 | | 2/2015 | |

(Continued)

*Primary Examiner* — Vicky A Johnson

(57) ABSTRACT

A torsional vibration damper for torsional vibration damping in a drive train of a motor vehicle is provided with a primary mass for introducing a torque, wherein the primary mass has a flywheel which can be connected to an input shaft, a secondary mass which can be rotated to a limited extent relative to the primary mass for dissipating a torque, an energy storage element that can act on the primary mass and on the secondary mass and a centrifugal pendulum connected to the secondary mass to provide restoring torque directed against a rotational irregularity, wherein the centrifugal pendulum is arranged in the axial direction between the flywheel of the primary mass and the energy storage element. By arranging the centrifugal pendulum between the flywheel of the primary mass and the energy storage element, otherwise free installation space on the outside can be used for better vibration damping behavior, while on the inside an increase in the axial installation space requirement is avoided, so that good damping is made possible in a drive train with a small installation space requirement.

13 Claims, 2 Drawing Sheets

(56) References Cited

FOREIGN PATENT DOCUMENTS

| | | |
|---|---|---|
| DE | 102017106112 A1 | 11/2017 |
| DE | 102016214469 A1 | 2/2018 |
| DE | 102018113308 A1 | 12/2019 |
| DE | 102018117721 A1 * | 1/2020 ........ F16F 15/13142 |
| WO | 2012172225 A1 | 12/2012 |
| WO | 2016198065 A1 | 12/2016 |
| WO | WO-2016198065 A1 * | 12/2016 ............ F16F 15/145 |

\* cited by examiner

TORSIONAL VIBRATION DAMPER

CROSS-REFERENCE TO RELATED APPLICATIONS

This application is the U.S. National Phase of PCT Appln. No. PCT/DE2019/100038 filed Jan. 16, 2019, which claims priority to DE 10 2018 108 404.8 filed Apr. 10, 2018, the entire disclosures of which are incorporated by reference herein.

TECHNICAL FIELD

The disclosure relates to a torsional vibration damper, in particular a dual-mass flywheel, which can be used to damp torsional vibrations in a drive train of a motor vehicle.

BACKGROUND

A torsional vibration damper is known from DE 10 2017 106 112 A1, in which a centrifugal pendulum is provided on a secondary mass of a dual-mass flywheel. The centrifugal pendulum is arranged radially inside an arc spring that acts on a primary mass and the secondary mass of the dual-mass flywheel.

There is a constant need to achieve good damping in a drive train with a small installation space.

SUMMARY

It is the object of the present disclosure to indicate measures which enable good damping in a drive train with a small installation space requirement.

Advantageous embodiments of the invention are specified the following description, each of which either individually or in combination can represent an aspect of the invention.

According to embodiments disclosed herein, a torsional vibration damper for torsional vibration damping in a drive train of a motor vehicle is provided with a primary mass for introducing a torque, wherein the primary mass has a flywheel which can be connected to an input shaft, in particular an engine shaft of a motor vehicle engine, a secondary mass that can be rotated to a limited extent relative to the primary mass for dissipating a torque, and an energy storage element in particular designed as an arc spring, which can act on the primary mass and on the secondary mass, and a centrifugal pendulum connected to the secondary mass to provide restoring torque directed against a rotational irregularity, wherein the centrifugal pendulum is arranged in the axial direction between the flywheel of the primary mass and the energy storage element.

The primary mass and the secondary mass connected via the energy storage element form a dual-mass flywheel with which torsional vibrations can be damped. Since the energy storage element and the centrifugal pendulum can be arranged on a comparatively large radius, both the dual-mass flywheel and the centrifugal pendulum can provide a high damping effect. The centrifugal pendulum has a substantially circular cylindrical installation space requirement. However, in the case of the dual-mass flywheel a substantially circular-cylindrical installation space requirement is only provided in the radius area of the energy storage element. The secondary mass, in particular an output flange that can tangentially strike the energy storage element, can have an offset profile in the radial direction. By arranging the centrifugal pendulum between the flywheel of the primary mass and the energy storage element, it is possible to provide a substantially beveled, for example V-shaped, course on the axial side of the torsional vibration damper pointing away from the primary mass, in particular on the gearbox side, so that the torsional vibration damper radially outside can have a significantly larger axial extent than radially inside. This makes use of the knowledge that a component following in the torque flow in the drive train of a motor vehicle, for example a motor vehicle transmission, generally requires more installation space radially on the inside than on the outside. This makes it possible for the torsional vibration damper to grip around this component somewhat radially on the outside, so that otherwise free installation space can be used for the torsional vibration damper. By arranging the centrifugal pendulum between the flywheel of the primary mass and the energy storage element, otherwise free installation space on the outside can be used for better vibration damping behavior, while on the inside an increase in the axial installation space requirement is avoided, so that good damping is made possible in a drive train with a small installation space requirement.

The primary mass and the secondary mass coupled to the primary mass so that it can rotate to a limited extent via the energy storage element, in particular designed as an arc spring, can form a spring-mass system that can damp rotational irregularities in the speed and torque of the drive power generated by a motor vehicle engine in a certain frequency range. The mass moment of inertia of the primary mass and/or the secondary mass and the spring characteristic of the energy storage element can thus be selected in such a way that vibrations in the frequency range of the dominant engine orders of the motor vehicle engine can be damped. The mass moment of inertia of the primary mass and/or the secondary mass can in particular be influenced by an attached additional mass. The primary mass can have a flywheel to which a cover can be connected, as a result of which a substantially annular receiving space for the energy storage element can be delimited. The primary mass can, for example, tangentially strike the energy storage element via impressions protruding into the receiving space. An output flange of the secondary mass, which can tangentially strike the opposite end of the energy storage element, can protrude into the receiving space. The flywheel of the primary mass can be coupled directly or indirectly to a drive shaft of a motor vehicle engine. The secondary mass can be coupled directly or indirectly, for example via an interposed disconnect clutch, to a transmission input shaft of a motor vehicle transmission.

The centrifugal pendulum can have a pendulum mass which is guided in a pendulum-like manner relative to a carrier flange, in particular via curved pendulum paths. Under the influence of centrifugal force, the at least one pendulum mass of the centrifugal pendulum strives to assume a position as far away as possible from the center of rotation. The "zero position" is therefore the position furthest radially from the center of rotation, which the pendulum mass can assume in the radially outer position. With a constant drive speed and constant drive torque, the pendulum mass will assume this radially outer position. In the event of speed fluctuations, the pendulum mass deflects along its pendulum path due to its inertia. In this way, the pendulum mass can be shifted in the direction of the center of rotation. The centrifugal force acting on the pendulum mass is divided into a component tangential to the pendulum path and a further component normal to the pendulum path. The tangential force component provides the restoring force that wants to bring the pendulum mass back into its "zero position", while the normal force component acts on a force application element that initiates the speed fluctuations, in particular the output flange of the secondary mass, and there generates a counter-torque that counteracts the speed fluctuation and damps the initiated speed fluctuations. In the case of particularly strong speed fluctuations, the pendulum mass can therefore have swung out to the maximum and can assume the position that is furthest in the radial direction. The paths provided in the carrier flange and/or in the pendulum mass have suitable curvatures for this purpose, in which a coupling element designed in particular as a roller can be guided. At least two rollers are preferably provided, each of which is guided on a path of the carrier flange and a pendulum track of the pendulum mass. In particular, more than one pendulum mass is provided. Preferably, several pendulum masses are distributed evenly in the circumferential direction on the carrier flange. The inertial mass of the pendulum mass and/or the movement of the pendulum mass relative to the carrier flange is designed in particular to damp a certain frequency range of rotational irregularities, in particular an engine order of the motor vehicle engine. In particular, more than one pendulum mass and/or more than one support flange is provided. For example, two pendulum masses connected to one another via bolts or rivets designed in particular as spacer bolts are provided, between which the carrier flange is positioned in the axial direction of the torsional vibration damper. Alternatively, two flange parts of the carrier flange, in particular connected to one another in a substantially Y-shape, can be provided, between which the pendulum mass is positioned.

In a further embodiment of the centrifugal pendulum, also referred to as a "U-centrifugal pendulum", the pendulum mass can have pendulum plates provided on different axial sides of the carrier flange, which are connected to one another via an intermediate piece arranged in a pendulum opening of the carrier flange. The intermediate piece can have a pendulum track, which can be guided in a pendulum-like fashion directly or indirectly on a path formed by the pendulum opening of the carrier flange. The pendulum track of the intermediate piece of the pendulum mass and the path of the carrier flange can be arranged in a common axial area and, viewed in the radial direction, at least partially overlap one another. A coupling element, for example designed as a roller, can be arranged between the pendulum track and the path, and under the influence of centrifugal force can lie against both the pendulum track and the path. Since the pendulum mass can only be guided in a pendulum-like manner via the intermediate piece on the carrier flange, it is not necessary to provide a pendulum track on the pendulum plates, so that the pendulum plates can be produced easily and inexpensively. In particular, the pendulum mass is guided in a pendulum-like manner on more than one coupling point, preferably precisely two coupling points, on the carrier flange. The intermediate piece can be designed for coupling at exactly one coupling point, so that a number of intermediate pieces corresponding to the number of coupling points provided for guiding the pendulum mass can be provided. Alternatively, the intermediate piece can be designed for coupling to exactly two or, if necessary, more coupling points, so that in particular precisely one intermediate piece can implement the number of coupling points provided for guiding the pendulum mass.

In particular, it is provided that the energy storage element, viewed in the axial direction, at least partially overlaps the centrifugal pendulum. The energy storage element and the centrifugal pendulum can be arranged in a common radial area. The energy storage element can already be provided as far radially outward as possible, so that only an overlap acting radially on the outside, in particular as a burst protection, and an optionally provided sliding shell for guiding the energy storage element in the circumferential direction radially outside of the energy storage element are provided. The centrifugal pendulum can thereby be positioned comparatively far radially on the outside, whereby the centrifugal pendulum can provide good damping behavior and a high insulating effect.

The primary mass preferably has a rib protruding, in particular substantially radially inward, to form an input stop that can tangentially strike the energy storage element, wherein the input stop and the centrifugal pendulum overlap in a common radius area viewed in the axial direction. A torque applied to the primary mass during pulling operation can be transmitted to the energy storage element via the rib. For this purpose, the rib can be arranged at least partially axially next to the centrifugal pendulum. The rib can, for example, encompass the centrifugal pendulum radially on the outside or only begin in an axial area next to the centrifugal pendulum. The rib and the centrifugal pendulum can be arranged in a common radial area. The centrifugal pendulum can thereby be positioned comparatively far radially on the outside, whereby the centrifugal pendulum can provide good damping behavior and a high insulating effect.

In embodiments, the primary mass has a cover, in particular in one piece, protruding axially from the flywheel for the radially outer overlap of the centrifugal pendulum and of the energy storage element, wherein the rib is connected to both the flywheel and to the overlap, in particular in one piece. With this structure, the primary mass can easily be designed as a cast part. An undercut caused by the rib can thereby be avoided so that the primary mass can be easily demolded. In this case, the rib can in particular form a draft angle, which increases the strength of the rib and enables high torques to be transmitted with little material use and installation space requirements.

In particular, the rib has a receiving pocket, which is open radially inward, for partially receiving the centrifugal pendulum, wherein the receiving pocket is in particular produced by machining. In the axial area of the centrifugal pendulum, a part of the rib can be removed compared to the rest of the rib in order to form the receiving pocket. Since the rib can be connected to the flywheel and to the overlap, the rib already has a sufficiently high strength that enables the rib to be made thinner in the axial direction in the axial area of the centrifugal pendulum. The receiving pocket can be formed, for example, by partially turning the rib in the axial area of the centrifugal pendulum. Due to the receiving pocket in the rib, the centrifugal pendulum can be positioned comparatively far radially outward, whereby the centrifugal pendulum can provide good damping behavior and a high insulating effect.

The rib is preferably produced by non-cutting forming, in particular embossing. The primary mass can be designed, for example, as a drawn pot made from sheet steel in order to form the flywheel and the overlap formed in one piece with the flywheel. The rib can be produced without cutting by pressure forming, for example by using a tool that acts radially on the outside to impress the rib as a bead protruding radially inwards. The torsional vibration damper can thereby be manufactured inexpensively.

In embodiments, the secondary mass has an output flange that can tangentially strike the energy storage element and an output part separate from the output flange, in particular configured as an output hub, wherein the output flange, the output part and the centrifugal pendulum are connected to one another via a common fastening means, in particular a riveted connection. A separate fastening means for fastening the centrifugal pendulum can be spared, so that the number of components is kept low. In addition, it is possible to keep the centrifugal pendulum pre-assembled as a separate structural unit, which can be installed as a whole during assembly. This simplifies assembly.

In particular, the secondary mass has an output flange that can tangentially strike the energy storage element, wherein the output flange has an axial thickness which is variable in the radial direction. The output flange can, for example, have a small axial thickness radially on the inside, so that the axial installation space requirement is kept small on the radial inside. If necessary, the output flange can have a small axial thickness radially on the outside in order to get past other components of the torsional vibration damper to the energy storage element. Due to the greater axial thickness of the output flange, in particular radially outside of the fastening means, the moment of inertia of the secondary mass can be increased, whereby a better damping behavior and a high insulating effect for the dual-mass flywheel can be achieved. This makes use of the knowledge that with a basically beveled course of a disk-shaped output flange with constant axial thickness between the output flange and the centrifugal pendulum, a free installation space remains that can be at least partially filled by the material of the correspondingly thickened output flange. Due to the thickened output flange, in particular an additional mass fastened separately to the secondary mass can be spared, so that the secondary mass can in particular be designed free of additional mass. The secondary mass preferably consists exclusively of the output flange, the output hub, the centrifugal pendulum, an optionally provided sealing membrane sealingly supported on the primary mass and the fastening means.

The output flange preferably has a first axial side pointing towards the centrifugal pendulum and a second axial side pointing away from the centrifugal pendulum, wherein in a common radial area of the output flange with the centrifugal pendulum, the first side substantially runs parallel to the centrifugal pendulum, in particular in a radial plane, and the second axial side has a stepped and/or beveled course in the radial direction. The output flange can thus have an approximately V-shaped cross section. As a result, the output flange can use the installation space that is otherwise free in the case of an output flange with constant axial thickness towards the centrifugal pendulum as fully as possible in order to increase its mass moment of inertia. Preferably, the first axial side of the output flange can axially limit the centrifugal pendulum and form an axial stop for the centrifugal pendulum, against which, for example, a pendulum mass can run axially via a sliding boss, which has a lower coefficient of friction than a steel/steel contact.

In embodiments, a lubricant, in particular lubricating grease, is provided radially outside of the centrifugal pendulum, wherein the energy storage element is immersed in the lubricant with part of its radial extension, wherein in particular for a radial immersion depth t to a radial extension R of the energy storage element $0.10 \leq t/R \leq 0.80$, preferably $0.25 \leq t/R \leq 0.75$, more preferably $0.40 \leq t/R \leq 0.60$ and particularly preferably $t/R = 0.50 \pm 0.05$ applies. The energy storage element can be arranged offset somewhat radially outward in the radial direction relative to the centrifugal pendulum, so that a radially outer edge of the energy storage element is arranged further radially outward than a radially outer edge of the centrifugal pendulum. This enables the energy storage element to be immersed sufficiently deeply in the lubricant to ensure sufficient lubrication when moving in the circumferential direction. At the same time, the centrifugal pendulum is spaced far enough radially inward from the lubricant, which is distributed radially outward due to the centrifugal force, that the pendulum masses of the centrifugal pendulum are not decelerated and detuned by being immersed in the lubricant during a pendulum movement. When a rotational movement of the torsional vibration damper is stopped, for example when the motor vehicle engine is switched off in a start/stop situation, the centrifugal pendulum can be spray-lubricated, in particular greased, by the lubricant. This allows a long service life of the centrifugal pendulum without the damping properties of the centrifugal pendulum being impaired by the lubricant.

BRIEF DESCRIPTION OF THE DRAWINGS

In the following, the disclosure is explained by way of example with reference to the attached drawings using preferred exemplary embodiments, wherein the features shown below can represent an aspect of the disclosure both individually and in combination, wherein.

DETAILED DESCRIPTION

Figure 1:
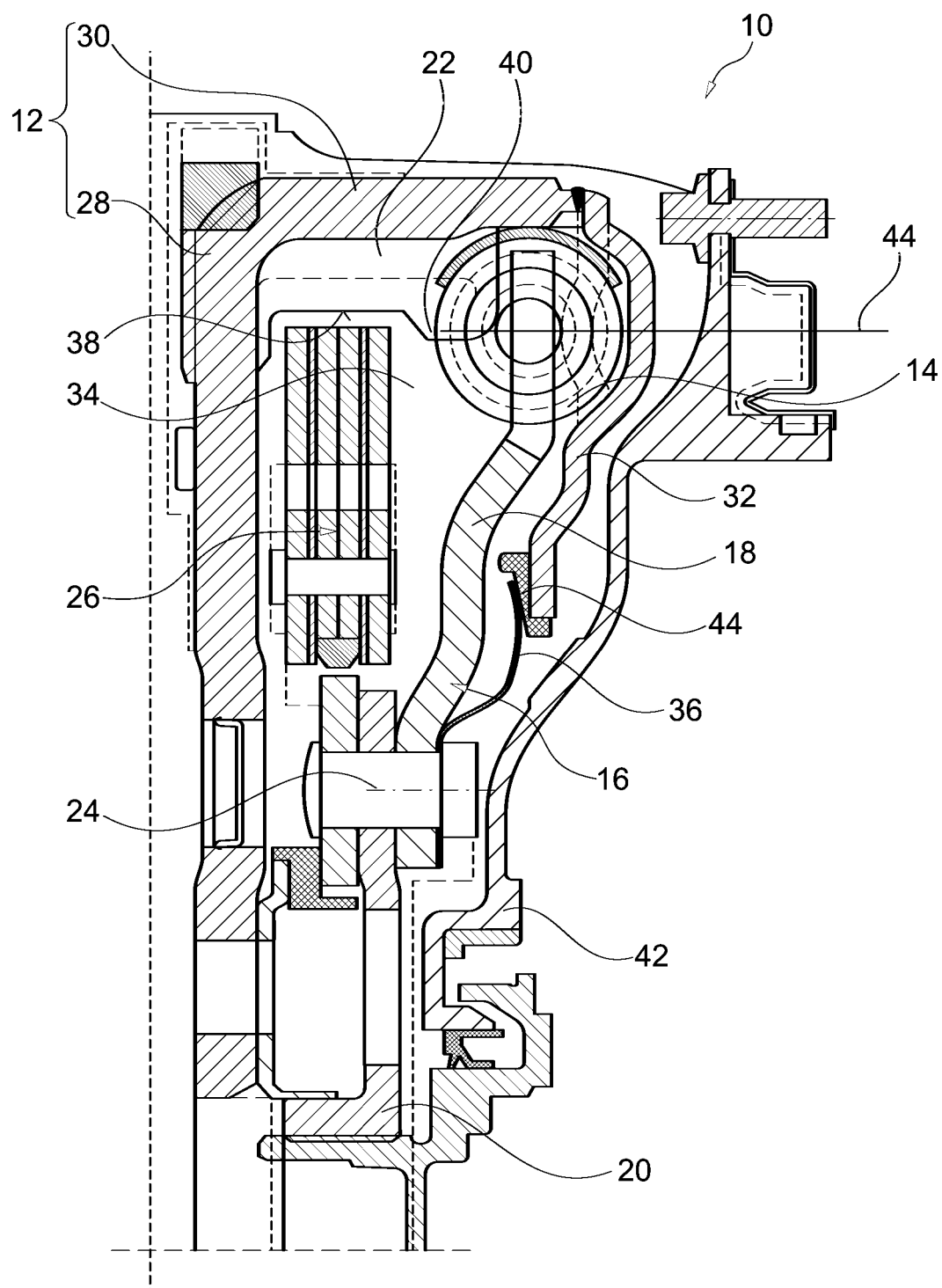
FIG. 1: shows a schematic sectional view of a first embodiment of a torsional vibration damper

The torsional vibration damper 10 shown in FIG. 1 can be used in a drive train of a motor vehicle so as to damp torsional vibrations generated by a motor vehicle engine. The torsional vibration damper 10 has a primary mass 12 that can be connected directly or indirectly to a drive shaft of the motor vehicle engine, to which a secondary mass 16 can be rotated to a limited extent via an energy storage element 14 designed as an arc spring. The secondary mass 16 has an output flange 18 which protrudes into a receiving space 34 partially delimited by the primary mass 12 and which can tangentially strike the energy storage element 14 received in the receiving space 34 in order to transmit a torque. The primary mass 12 can have ribs 22, which protrude into the receiving space 34 and are designed as impressions, which can tangentially strike the opposite end of the energy storage element 14. In the exemplary embodiment shown, the secondary mass 16 has an output hub 20 fastened to the output flange 18, which can be coupled, for example, to a transmission input shaft of a motor vehicle transmission, possibly via an interposed separating clutch. The output hub 20 and the output flange 18 are connected via a fastening means 24 designed as a rivet connection, which at the same time also fastens a centrifugal pendulum 26.

The pot-shaped primary mass 12 has a flywheel 28 which is arranged substantially in a radial plane and from which a cylindrical overlap or flange portion 30 protrudes in the axial direction. The overlap or flange portion 30 is arranged radially outside of the centrifugal pendulum 26 and the energy storage element 14. A cover 32 is fastened to the overlap or flange portion, in particular by welding, which covers the energy storage element 14 and a part of the output flange 14 on the axial side facing away from the flywheel 28. The receiving space 34 can be sealed with the aid of a sealing membrane 36 which is fastened under prestress to the output flange 18 via the fastening means 24 and which is supported in a relatively rotatable manner on the cover 32 via a sliding ring 44.

The centrifugal pendulum 26 is arranged in the axial direction between the flywheel 28 of the primary mass 12 and the energy storage element 14 or output flange 18 of the secondary mass 16. Here, the centrifugal pendulum 26 is arranged radially outward to such an extent that, viewed in the axial direction, a radially outer part of the centrifugal force pendulum 26 is arranged in a common radius area with the energy storage element 14. For this purpose, a receiving pocket 38 that is open radially inward can be formed in the rib 22, into which the centrifugal pendulum 26 can partially protrude from the radial inside. The rib 22 can form an input stop 40 that can tangentially strike the energy storage element 14, which can preferably delimit an axial side of the receiving pocket 38 and can also be partially arranged in a common radius area with the radially outer part of the centrifugal pendulum 10. Alternatively, the receiving pocket 38 can be designed to be open on one side toward the cover 32 and form the input stop 40 with the smaller radial extension in order to simplify the assembly of the centrifugal pendulum 10 in the torsional vibration damper 10.

The arrangement of the centrifugal pendulum 10 radially on the outside and offset in the axial direction next to the energy storage element 14 results in a large axial extent for the torsional vibration damper 10 on the radial outside and a small axial extent on the radial inside due to an inclined and/or stepwise course of the output flange 18. As a result, the torsional vibration damper 10 can somewhat encompass a housing 42, which is, for example, part of a motor vehicle transmission, radially on the outside in the axial direction in order to use the installation space kept free radially outside of the housing 42.

A lubricant, in particular lubricating grease, can be provided in the receiving space 34, which, due to centrifugal force, can extend from the overlap or flange portion 30 to a fill level radius 44. The lubricant is thus arranged slightly radially outside of the centrifugal pendulum 10, wherein it is possible for the energy storage element 14 to be partially, in particular substantially half, immersed in the lubricant.

Figure 2:
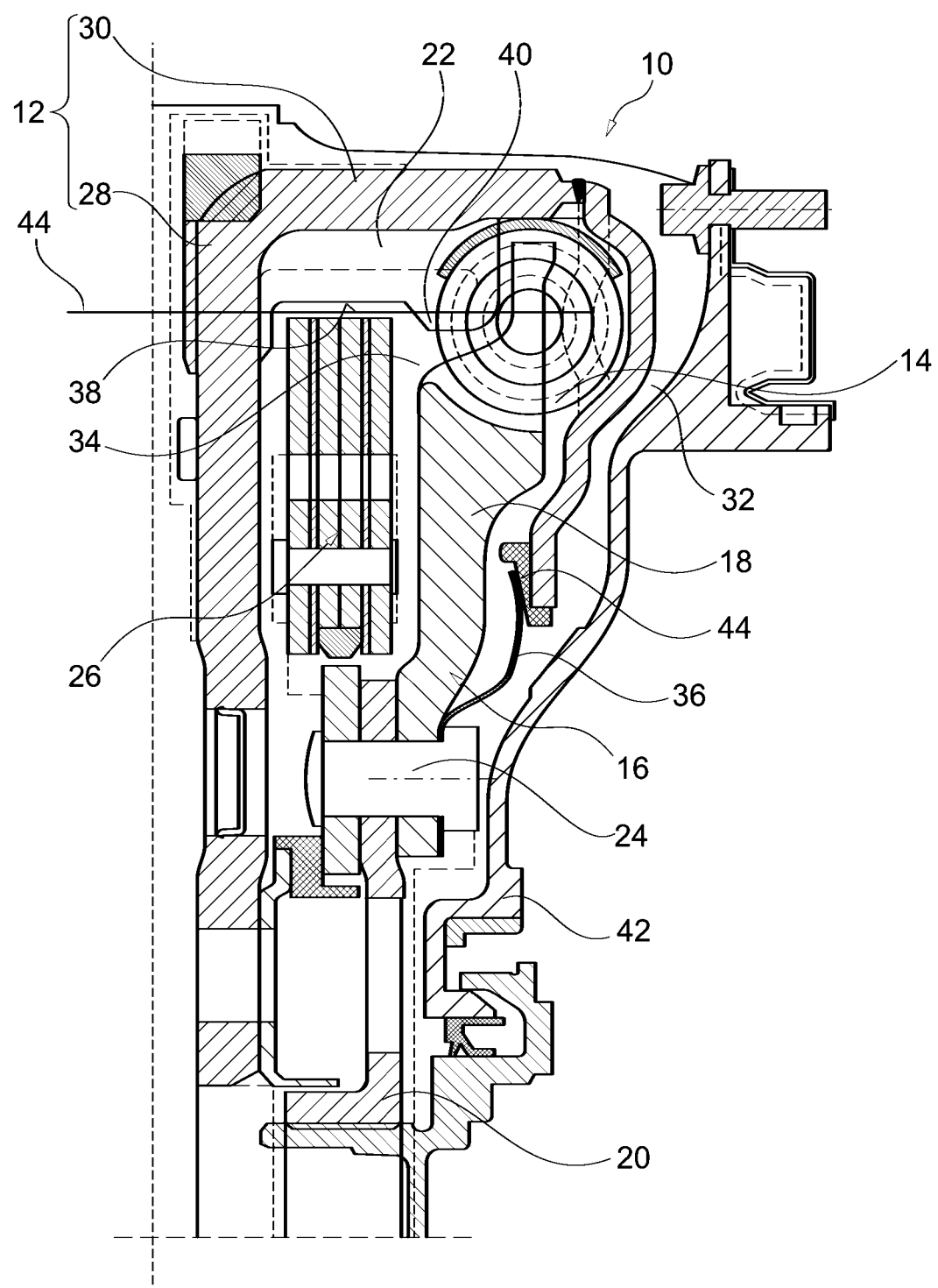
FIG. 2: shows a schematic sectional view of a second embodiment of a torsional vibration damper.

In the embodiment of the torsional vibration damper 10 shown in FIG. 2, the output flange 18 is thickened in comparison to the embodiment of the torsional vibration damper 10 shown in FIG. 1 in order to significantly increase the mass moment of inertia of the secondary mass 16. The free volume of the receiving space 34 between the output flange 18 and the centrifugal pendulum 26 shown in FIG. 1 is largely filled by the material of the output flange 18 in the embodiment of the torsional vibration damper 10 shown in FIG. 2. A separate additional mass provided in the axial direction between the output flange 18 and the housing 42, in particular between the sealing membrane 36 and the housing 42, is spared.

LIST OF REFERENCE NUMBERS

10 Torsional vibration damper
12 Primary mass
14 Energy storage element
16 Secondary mass
18 Output flange
20 Output hub
22 Rib
24 Fastening means
26 Centrifugal pendulum
28 Flywheel
30 Overlap or flange portion
32 Cover
34 Receiving space
36 Sealing membrane
38 Receiving pocket
40 Input stop
42 Housing
44 Sliding ring

The invention claimed is:

1. A torsional vibration damper for torsional vibration damping in a drive train of a motor vehicle, having
   a primary mass for introducing a torque, wherein the primary mass has a flywheel which can be connected to an input shaft of a motor vehicle engine,
   a secondary mass which can be rotated to a limited extent relative to the primary mass for dissipating a torque,
   an energy storage element that can act on the primary mass and on the secondary mass, and
   a centrifugal pendulum connected to the secondary mass and configured to provide a restoring torque directed against a rotational irregularity,
   wherein the centrifugal pendulum is arranged in an axial direction between the flywheel of the primary mass and the energy storage element,
   wherein the primary mass has a rib protruding substantially radially inward to form an input stop configured to tangentially strike the energy storage element, wherein the input stop and the centrifugal pendulum overlap in a common radius area viewed in the axial direction.

2. The torsional vibration damper according to claim 1, wherein the energy storage element, viewed in the axial direction, at least partially overlaps the centrifugal pendulum.

3. The torsional vibration damper according to claim 1, wherein the primary mass has a flange portion protruding axially from the flywheel for a radially outer overlap of the centrifugal pendulum and the energy storage element, wherein the rib is connected to both the flywheel and to the flange portion.

4. The torsional vibration damper according to claim 1, wherein the rib has a receiving pocket which is open radially inward for partially receiving the centrifugal pendulum.

5. The torsional vibration damper according to claim 1, wherein the rib is produced by embossing.

6. The torsional vibration damper according to claim 1, wherein the secondary mass has an output flange configured to tangentially strike the energy storage element and an output part separate from the output flange, wherein the output flange, the output part and the centrifugal pendulum are connected to one another via a common riveted connection.

7. The torsional vibration damper according to claim 1, wherein the secondary mass has an output flange configured to tangentially strike the energy storage element, wherein the output flange has an axial thickness which is variable in a radial direction.

8. The torsional vibration damper according to claim 7, wherein the output flange has a first axial side pointing towards the centrifugal pendulum and a second axial side pointing away from the centrifugal pendulum, wherein in a common radial area of the output flange with the centrifugal pendulum, the first side substantially runs parallel to the centrifugal pendulum, in a radial plane, and the second axial side has a stepped or beveled course in the radial direction.

9. The torsional vibration damper according to claim 1, wherein a lubricant is provided radially outside of the centrifugal pendulum, wherein the energy storage element is immersed in the lubricant with part of its radial extension, wherein for a radial immersion depth t to a radial extension R of the energy storage element $0.10 \leq t/R \leq 0.80$.

10. The torsional vibration damper according to claim 9, wherein for the radial immersion depth t to the radial extension R of the energy storage element $0.25 \leq t/R \leq 0.75$.

11. The torsional vibration damper according to claim 9, wherein for the radial immersion depth t to the radial extension R of the energy storage element $0.40 \leq t/R \leq 0.60$.

12. The torsional vibration damper according to claim 9, wherein for the radial immersion depth t to the radial extension R of the energy storage element $t/R = 0.50 \pm 0.05$.

13. The torsional vibration damper according to claim 1, wherein the energy storage element is designed as an arc spring.

\* \* \* \* \*